United States Patent [19]
Schenkenberg et al.

[11] 3,911,005
[45] Oct. 7, 1975

[54] 1,3,2-DIAZAPHOSPHOLIDINE COMPOUNDS

[75] Inventors: Philip R. Schenkenberg, Glendale; Charles R. Williams, St. Louis, both of Mo.

[73] Assignee: Monsanto Company, St. Louis, Mo.

[22] Filed: Sept. 12, 1974

[21] Appl. No.: 505,392

[52] U.S. Cl. .......................... 260/551 P; 8/116 P
[51] Int. Cl.² ........................................ C07F 9/22
[58] Field of Search ........................... 260/551 P

[56] References Cited
UNITED STATES PATENTS

| | | | |
|---|---|---|---|
| 3,304,270 | 2/1967 | Dickerson | 260/551 P X |
| 3,463,813 | 8/1969 | Dickerson | 260/551 P |
| 3,522,303 | 7/1970 | Ulrich | 260/551 P |

OTHER PUBLICATIONS
"2-Alkylamino-2-oxo-1,3-diaza-2-phosphacyclopentanes," Ozaki et al., CA 78:147971m (1973).

*Primary Examiner*—Daniel E. Wyman
*Assistant Examiner*—Thomas A. Waltz
*Attorney, Agent, or Firm*—William H. Duffey

[57] ABSTRACT

Novel compounds represented by the structure

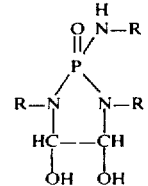

where all R substituents are identical and are methyl or ethyl. The compounds are useful as durable fire retardants for cellulosic materials.

4 Claims, No Drawings

1,3,2-DIAZAPHOSPHOLIDINE COMPOUNDS

This invention relates to novel phosphorus-nitrogen ring compounds useful as durable fire retardants for cellulosic materials. These compounds are represented by the structure

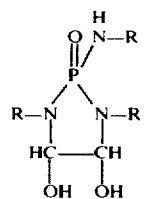

where all R substituents are identical and are methyl or ethyl.

The novel compounds of this invention can be prepared by the reaction of a trialkylphosphoric triamide and aqueous glyoxal at a ph of about 7 with moderate heating. In a preferred embodiment, trimethylphosphoric triamide (abbreviated as "TPA") is employed, resulting in a product wherein the "R" group of the above structure is methyl, the product being 1,3-dimethyl-2-methylamino-2-oxo-4,5-dihydroxy-1,3,2-diazaphospholidine.

The TPA reactant employed herein was prepared by a modification of the method of Holmes. The latter is described in *Inorganic Chemistry*, 1, 89 (1962) by Robert R. Holmes and James A. Forstner. After adding an excess of dry methylamine to a cold (approximately 35°C.) solution of $POCl_3$ in heptane, the product was extracted with 3 equivalents of aqueous sodium hydroxide, thereby neutralizing the amine hydrochloride. After separation from the heptane, the aqueous solution was concentrated, filtered, concentrated additionally and refiltered to arrive at a solution which was 70% TPA, 7% NaCl, 2 to 5% hydrolysis products of TPA and water. With the exception of precipitates, viz., $Na_4P_2O_7$ or hydrates thereof, formed by further hydrolysis of the impurities, this solution was stable. Pure, crystalline TPA was obtained by azeotropic drying of the aqueous solution with chloroform followed by filtration to remove salts, concentration and a double crystallization of the solute. Yield of the crude aqueous solution was generally 80 to 90%. A yield as high as 70% was observed for the purification step, affording a product that melted at from 105° to 110°C. This product could be sublimed in vacuum with no apparent improvement in purity.

A typical preparation of the monohydrate of 1,3-dimethyl-2-methylamino-2-oxo-4,5-dihydroxy-1,3,2-diazaphospholidine is set forth in the following example.

EXAMPLE I

Filtered 40% aqueous glyoxal (159 g.) was weighed into a 500 milliliter flask. The flask was equipped with a magnetic stirring bar, a thermometer and a pH electrode which had been standardized against pH 7 buffer. The pH of the solution was adjusted to 7.0 with a 50% aqueous sodium hydroxide solution. TpA (150 g.) was then added to the flask and the pH was maintained at 7.0, with stirring. The pale yellow solution was then heated slowly to 65°C. with dropwise addition of sodium hydroxide to maintain the pH at 7.0. The contents were held at this temperature for 8 minutes and then quenched in ice to 25°C. The solution was still pale yellow but no solid formed until after 3 to 4 hours. The crystals were filtered and washed with small quantities of an 80%/20% tetrahydrofuran/ethanol solution and dried in a nitrogen stream. With 98 g. of product recovered, this amounted to a 42% yield based on 233 g. theory for

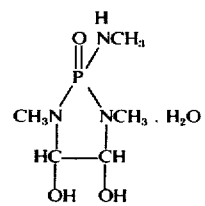

These off-white crystals melted at 106°–115°C. and could be recrystallized from hot water to give a snow-white solid melting at 107°–115°C. but having substantially identical analytical data and spectra. The molecular weight of the recrystallized product was found to be 202 by vapor pressure osmometry in methanol versus a theoretical of 213. The product of EXAMPLE I is soluble in water, methanol and ethanol but insoluble in tetrahydrofuran and chloroform.

TABLE I below summarizes the analyses of the initial product and the recrystallized product.

TABLE I

| Element | Elemental Analyses Theory (monohydrate) | Found (initially) | Found (recrystallized) |
|---|---|---|---|
| P (1) | 14.55 | 14.49 | 14.49 |
| N (3) | 19.72 | 19.55 | 19.33 |
| C (5) | 28.72 | 28.13 | 28.00 |
| H (16) | 7.51 | 7.66 | 7.60 |
| [O (3)]* | 30.05 | (30.16) | (30.58) |
| Melting Point | — | 106–115°C. | 107–115°C. |

*By difference

In preparing a compound of this invention where R is ethyl, triethylphosphoric triamide instead of TPA is reacted with aqueous glyoxal according to the procedure of EXAMPLE I above.

The phosphorus-nitrogen ring compounds of the present invention, in both the hydrated and the anhydrous form, are useful as treating agents for imparting fire retardance to cellulosic materials such as textile fabrics.

The exact manner of treating cellulosic substrates with novel compounds of this invention is not critical. It is generally desired that the cellulosic material be impregnated with the phosphorus-nitrogen ring compound from an aqueous medium. Although the use of an aqueous medium is preferred, particularly within the textile industry, organic media such as hydrocarbons, alcohols, ethers, amides and the like are sometimes utilized.

According to conventional standards, a flame retardant or flame resistant cellulosic material is one where, although the surface or article may burn when in direct contact with a flame source, the flame will extinguish when the source is removed rather than continue to propagate.

Thus, the amount of phosphorus-nitrogen ring compound which is applied to the cellulosic substrate must be sufficient to render the substrate flame resistant. As a general rule, about 1.0% or more by weight of phosphorus, based upon the weight of the cellulosic substrate, will render the substrate flame retardant.

In flame retarding a cellulosic substrate with the phosphorus-nitrogen ring compounds of the present invention, the substrate (fabric) is passed through a bath comprising an aqueous solution of the compound and thereafter cured at a temperature above 100°C., preferably from 120°C. to 200°C. for a period of 1 minute to 1 hour, the latter duration depending upon cure temperature and other variables.

It is usually found desirable to employ a latent acid catalyst in aqueous solution with the phosphorus-nitrogen ring compound. Non-limiting examples of such catalysts are magnesium chloride and 2-amino-2-methylpropanol-1-hydrochloride. The catalyst may be typically present in about 1 percent by weight of the aqueous solution which comprises the bath for treating the cellulosic substrate.

Resin type coreactants are often desirable in conjunction with phosphorus-nitrogen compounds of the present invention. They are typically present in about 5 percent by weight of the bath solution although considerable variation is permissible in this concentration. Non-limiting examples of suitable coreactants include substituted melamines, guanamines and dimethylol cyclic alkylene ureas. Suitable substituted melamines include the methylol melamines such as di- and tri-methylol melamines and modified methylol melamines such as the trimethyl ether of trimethylol melamine.

What is claimed is:

1. A compound represented by the structure

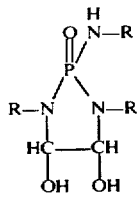

where all R substituents are identical and are methyl o ethyl.

2. A compound represented by the structure

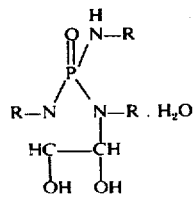

where all R substituents are identical and are methyl or ethyl.

3. A compound of claim 1 wherein R is methyl.

4. The compound 1,3-dimethyl-2-methylamino-2-oxo-4,5-dihydroxy-1,3,2-diazaphospholidine.

* * * * *

UNITED STATES PATENT OFFICE
CERTIFICATE OF CORRECTION

PATENT NO. : 3,911,005
DATED : October 7, 1975
INVENTOR(S) : Philip R. Schenkenberg and Charles R. Williams It is certified that error appears in the above-identified patent and that said Letters Patent are hereby corrected as shown below:

Col. 1, line 21, "ph" should be -- pH --.

Col. 1, line 44, "agueous" should be -- aqueous --.

Col. 1, line 63, "TpA" should be -- TPA --

Claim 2, correct structure to read

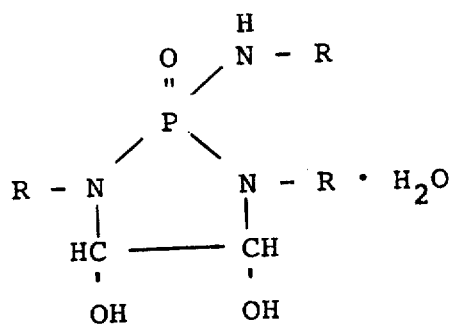

Signed and Sealed this thirtieth Day of December 1975

[SEAL]

Attest:

RUTH C. MASON
Attesting Officer

C. MARSHALL DANN
Commissioner of Patents and Trademarks